United States Patent [19]

Johansson

[11] 4,203,505

[45] May 20, 1980

[54] CAR HOIST

[76] Inventor: Rolf G. Johansson, S 130 11 Saltsjo-Duvnas, Sweden

[21] Appl. No.: 994

[22] Filed: Jan. 3, 1979

[51] Int. Cl.[2] .............................................. B60S 13/00

[52] U.S. Cl. .................................... 187/81.7; 187/8.5; 254/26

[58] Field of Search .................... 187/8.41, 8.71, 8.72, 187/8.43, 8.57, 8.49, 8.5, 17; 254/2 R, 2 B, 2 C, 10 R, 10 B, 10 C, 45, 93 R, 93 L, 93 VA

[56] References Cited

U.S. PATENT DOCUMENTS

| | | | |
|---|---|---|---|
| 2,843,222 | 7/1958 | Villars | 187/8.41 |
| 3,026,970 | 3/1962 | Woolslayer et al. | 187/8.72 |

*Primary Examiner*—Kenneth W. Noland

[57] ABSTRACT

The lifting device comprises an upright mast section, a lifting motor, a lifting arm having one end slidably mounted in the mast section and extending outwardly therefrom, the lifting arm being pivotally connected to the motor, and a lifting fork pivotally connected to the opposite free end of the lifting arm; the lifting arm and the lifting fork, in their lowest position, extend horizontally outwardly from the mast section; the arm and the fork are hingedly mounted to and vertically-displaceable along the mast section in such a manner that, when the lifting arm is first vertically displaced from the said lowest position by the lifting motor, the lifting arm pivots about its end inside the mast section to an outward and downward inclined position while the lifting fork pivots about its end adjacent the mast section to an outward and upward inclined position; the lifting motor thereafter causes the lifting arm and the lifting fork to further travel upward along the mast section in their relative inclined position.

16 Claims, 5 Drawing Figures

CAR HOIST

The purpose of this invention is to lift an object, such as an automotive vehicle. The invention comprises an upright mast section in which are secured: a lifting motor; a lifting arm, the inner end of which is slidably mounted along the mast section from which the arm freely extends outwardly; and a lifting fork pivotably connected to the free end of the lifting arm whereby the object to be lifted may be held by the lifting arm and the lifting fork.

A lifting device of this type is known from Swedish Pat. No. 72 13247-5 which, in comparison to other known lifting devices having two or four upright masts, has, as its major advantages, a safety function, simplicity in its design, etc. In comparison to a lifting device constructed in accordance with the principles of a fork lift for example, the said known device advantageously operates as follows: its lifting arm and lifting fork move a certain distance upwards along the upright mast in a horizontally and parallel relationship to one another the continuous travel upwards along the upright mast in altered by abutment means that cause the lifting fork to pivot at its connection point with the lifting arm. As the lifting arm and the lifting fork form a V-configuration to each other with the vehicle's under body or wheels resting on these lifting elements, the under portion of the vehicle becomes easily accessible. When using said known device, the pivotal movement between the lifting arm and the lifting fork causes the vehicle to tilt towards the mast section, which is undesirable for certain uses.

The object of the present invention is to overcome this disadvantage and to provide a lifting device for lifting a vehicle, such as an automotive vehicle, where the lifting arms first form the V-configuration without tilting the vehicle, and, secondly, where the lifting arms may be lifted vertically along the upright mast section to the desired working height. The lifting device in accordance with the present invention is so constructed as to eliminate the risks of the vehicle falling unintentionally or lowering from a lifted position. For this purpose, the present invention includes a number of locking devices being of, both, hydraulic and mechanical functions which act independently of one another.

A preferred construction of the invention will hereinafter be described with reference to the accompanying drawings in which.

Figure 2:
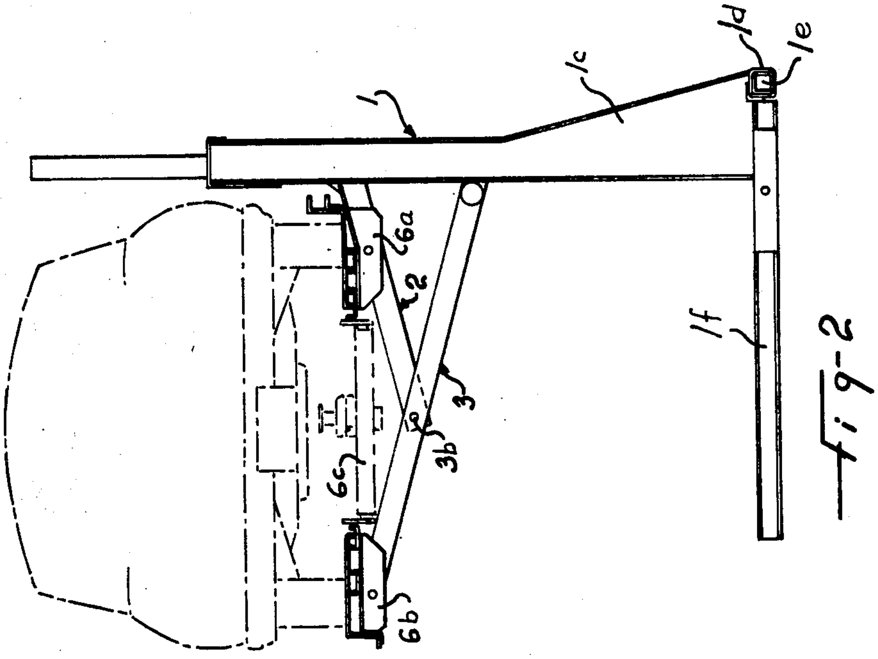
FIG. 2 is a view similar to FIG. 1 with the lifting arms in the lifted position.
Figure 1:
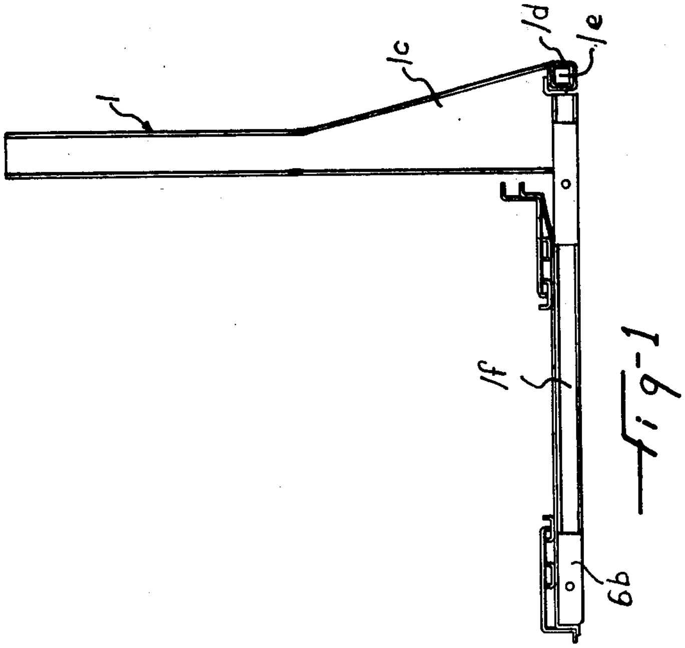
FIG. 1 is a side view of a lifting device made in accordance with the present invention with the lifting arms in the lowermost position.
Figure 5:
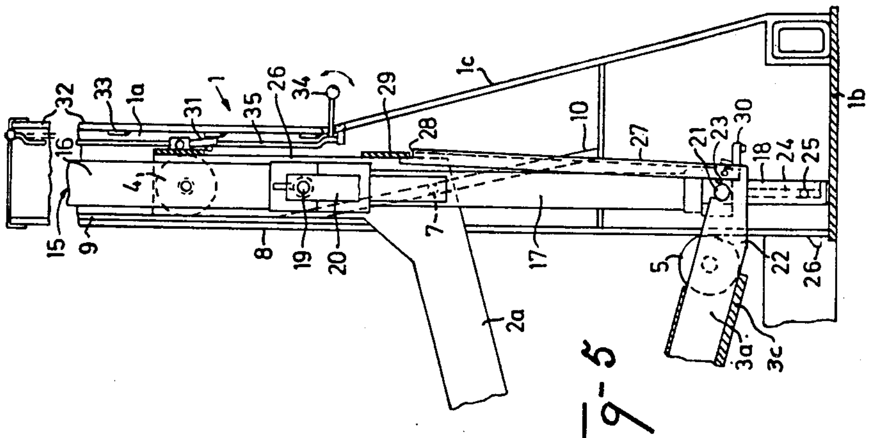
FIG. 5 is a cross-sectional view similar to FIGS. 3 and 4, showing the lifting fork and the lifting arm in a partial lifted position.

The lifting device made in accordance with the present invention comprises a vertical mast section 1, a lifting arm 2 which extends outwardly from the front portion of the mast 1 and the inner ends of which are slidably mounted up and down the mast, and a lifting fork 3 which is pivotably connected to the outer ends of the lifting arm 2. The mast 1 is preferably constructed of two channel members or I-beams 1*a* which are vertically arranged in opposite parallel relationship to one another with the upper and rear portions thereof rigidly connected cross-wise to one another and with the lower portions thereof mounted to a bottom plate 1*b*. At the lower portion of the mast section 1*a* is shown a wedge-shaped portion 1*c* that includes tracks for rollers and a power source which will be later described. A guiding beam (not shown) for the inner ends of the lifting arm 2 can be located in a parallel relationship with the two mast sections 1*a* and be connected to the upper end of the mast section and to the base plate 1*b*. This guiding beam serves to transfer the downward forces to the mast sections and to protect the lift motor located between the mast sections.

On the lower portion of the mast is shown a number of mounting brackets 1*d*, into which hollow sections 1*e*, 1*f* can be inserted to form a solid base portion to support the upright mast section 1. If desired, the bottom sections 1*e* and 1*f* can be equipped with suitable retractable wheels (not shown) in order to make the entire lifting device easily displaceable.

The lifting arm 2 consists preferably of two parallel side beams 2*a*, which are connected to each other with cross-members in order to form a rigid structure. The inner portion of at least one (preferably two) beam 2*a* is equipped with a lever 2*b* extending upwardly in an obtuse angle. The inner ends of the beams are pivotably connected at point 7 to a lift motor 15 which will be later described.

At the upper free end of each lever 2*b* is mounted a free wheeling roller 4. The purpose of roller 4 is to roll along a guide rail 9–10 in the upright 1 when the lifting arm 2 is raised or lowered by the lifting motor 15. Each guide rail comprises a lower portion 10 which consists of a welded plate located in each of the enlarged lower portion of upright beam 1*a* and which extends to the inner surface of the front flanged portion 9 of the upright beam 1*a* to which it is attached and along which it extends longitudinally upwardly.

Figure 4:
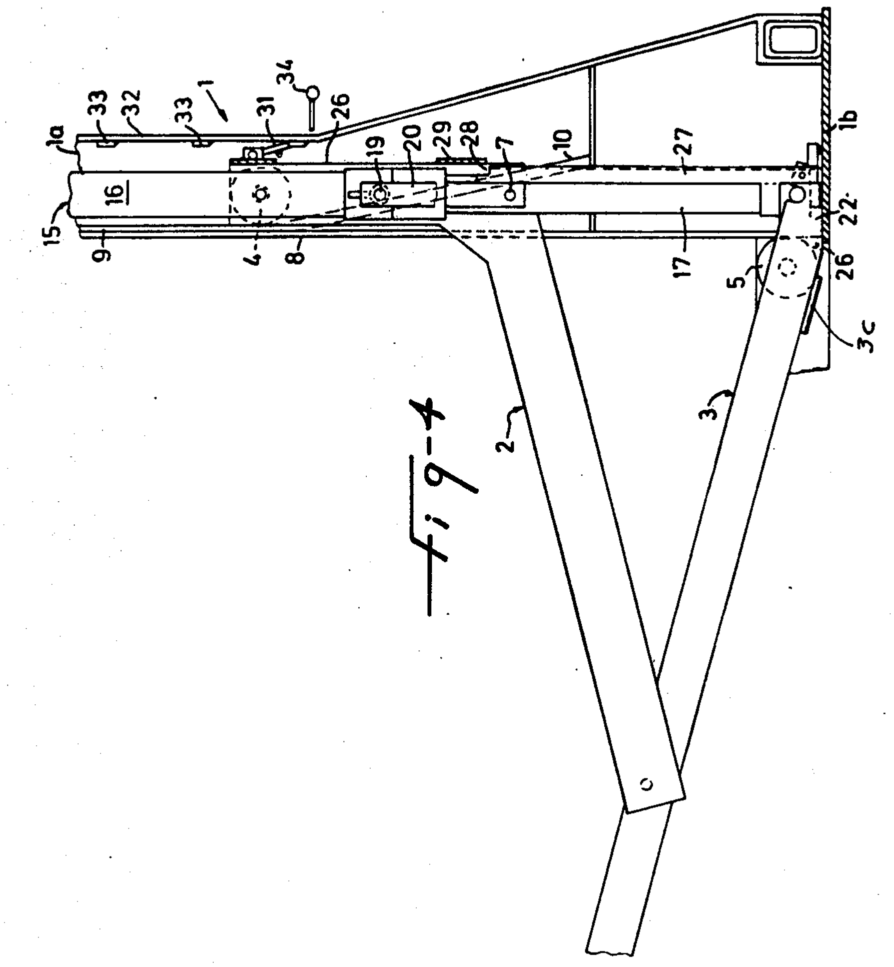
FIG. 4 is a cross-sectional view similar to FIG. 3, but showing the lifting arm and the lifting fork after completion of their pivotal movement.

The angle between beam 2*a* and lever 2*b* and the angle between the upper and lower portions of the guiding rail is set in such a manner that, when the lifting arm 2 is in its lowest position, roller 4 is in contact with the lower portion 10 of the guide rail; in this position, lifting arm 2 is parallel and close to the floor. When the pivot point of attachment 7 on the lifting arm 2 is raised, roller 4 moves upwards along the inclined portion 10 of the guide rail while moving frontwardly towards the front flange 9 thereby causing lever 2*b* and beam 2*a* to pivot about point 7. When roller 4 reaches the intersection between the inclined rail portion 10 and the vertical straight portion 9, beam 2*a* (FIG. 4) maintains a fixed inclined position. During the continuous upward travel of pivot point 7, roller 4 moves along the vertical portion 9 of the guide rail and lifting arm 2 is raised remaining in its inclined position. When pivot point 7 is thereafter lowered, the lifting arm performs the same movements in reversed manner.

The lifting fork 3, which is pivotally connected to the free end of lifting arm 2, consists of two parallel beams 3*a* which are preferably connected to one another at their inner end by a plate 3*c*. The pivot connection 3*b* extends perpendicularly to the lifting arm 2 and through the center of the fork-like arms 3*a*. At the inner end of lifting arm 3 is provided a free wheeling roller 5. The rollers 5 are located so as to contact a rail which preferably is the outer surface of flanges 9 of the upper mast section 1*a*. When the inner end of the lifting arm 2 is raised, as earlier described, and when the lifting arm 2 simultaneously angulates downwards, the pivot 3*b* between the lifting arm 2 and the lifting fork 3 moves upwards and towards the upright mast section. This results in that beam 3*a* of the lifting fork 3 pivots upwards around the shafts of rollers 5 which thereby act as a fixed pivot point for the lifting fork 3. When the lifting arm 2 reaches its final inclined position, as earlier described, and begins to travel vertically upwards maintaining its inclined position, the pivot shaft 3*b* will follow in the same direction carrying with it the lifting fork 3 and rollers 5 will roll upwards contacting the guide rails 8.

It should be mentioned that the inclination of the lifting arm 2 and the lifting fork 3 can be altered by altering the length and/or angles of the above-mentioned members. From the above, it may be deducted that the lifting sequence caused by the lifting motor 15 is that, first, the lifting arm 2 and the lifting fork 3 are moved into a V-configuration with respect to one another and the lifting object is slightly lifted from the floor. Thereafter, the lifting arm and the lifting fork are vertically raised to a desired height and the V-configuration is maintained without tilting the lifted object. The latter is resting on support means 6*a* which is pivotally mounted to the inner side of the lifting arm 2 and on support means 6*b* which is pivotally and slidably mounted on the outer side of the lifting fork 3; the pivot shafts for these support means are parallel to pivot shaft 3*b*. The distance between said support means is maintained by a spacer 6*c*. Support means 6*a* and 6*b* may be of conventional design: it can be constructed to support an automotive vehicle by its frame or be constructed to support it by its wheels. Since these support means do not constitute an innovative step of the present invention, they will not be described in greater detail.

The major function of the lifting device has been described above. What follows is a description in detail of a preferred construction.

The lift motor is of the linear type and is disposed vertically in the center between the mast beams 1*a* of the upright mast section 1. It is preferably an hydraulic motor with a piston and cylinder, but it may also be a rack and pinion motor or a worm gear motor.

As shown in the drawings, the lifting motor 15 is of an hydraulic type and consists of a cylinder 16 in which is displaceably mounted a primary piston arrangement 17 which consists of a piston and a piston rod through which is drilled a cylinder hole. A secondary piston and piston rod arrangement 18 is longitudinally displaceable in the cylinder hole of the fist piston arrangement 17. Two radially protruding shoulder joints 19 on cylinder 16 serve as bearings for the upper portion of two tie-rods 20 which have their lower ends pivotally connected to the pivot connection 7 of the inner end of the lifting arm 2. This provision enables the pivot shaft 7 to be lowered onto the base plate 1*b* of the upright mast section where the lifting arm 2 is at its lowest position, i.e. horizontal.

In a similar manner, there are provided on the outside portion of the piston arrangement 17 of the cylinder, two diametrically opposite radially extending lugs 21. At the location closest to the upright mast section, arm 3*a* of the lifting fork 3 is equipped with an extension element 22 which by-passes the shaft for the rollers 5 of the lifting fork and forms a fork which encloses the lifting motor 15. The extension element 22 is equipped with a groove 23 which is located in the upper portion of the extension element 22 and which receives lugs 21 of the first primary piston arrangement 17.

The secondary displaceable piston arrangement 18 is included within the primary piston arrangement 17 and has its piston end resting on the bottom plate 1*b* of the upright mast section 1. The effective area of the secondary piston arrangement 18 has less area than the corresponding area of the primary piston arrangement 17.

Figure 3:
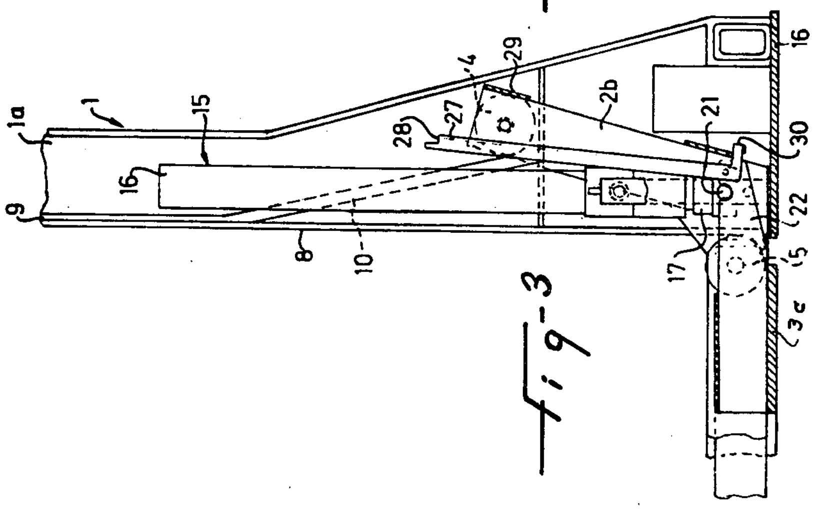
FIG. 3 is a cross-sectional view of the lower portion of the mast with the respective ends of the lifting arm and of the lifting fork in their lowermost position.

When a pressurized medium is supplied by an hydraulic pump (not shown) or by other means, through the tube-like piston rod of the secondary piston arrangement into the upper closed portion of cylinder 16, when the entire lifting device is in its lowest position as shown in FIG. 3, i.e. when the primary and secondary piston arrangements are fully inserted into one another and into cylinder 16, the pressurized medium causes a pushing action onto the inside surfaces of the respective pistons. Since the area of the primary piston arrangement 17 has a larger area than that of the secondary piston arrangement 18, a movement will first take place between cylinder 16 and the piston arrangement 17 due to the relative distribution of the piston areas as explained above. The secondary piston arrangement 18 maintains its location in the primary piston arrangement. The primary movement causes cylinder 16 to be raised carrying with it via shoulder joints 19, tie-rods 20 and pivot shaft 7, the inner end of the lifting arm 2. As rollers 4 move along guide rail 10, the lifting arm 2 is thereby caused to be pivoted in an outward and downward inclined position; at the same time, the primary piston arrangement 17 which remains stationary causes the inner end of arms 3*a* of lifting fork 3 to remain at the lower portion of the upright mast section as a result of lugs 21 being engaged in extension 22 of the lifting fork; thus, arms 3*a* swivel upwardly with rollers 5 acting as bearing and pivot points.

When cylinder 16 reaches the end of its predetermined stroke length in primary piston unit 17, rollers 4 of the lifting arm 2 reach the vertical straight portion 9 of the guide rail 9–10 and the lifting arm 2 and the lifting fork 3 remain in a fixed inclined position. The pressurized medium will then push the secondary piston arrangement 18 out of the primary piston arrangement 17 whereby the primary piston arrangement 17 and the cylinder 16 will be raised unchanged relative to one another thereby carrying with them the lifting arm 2 and the lifting fork 3, also unchanged relative to each other.

The relation between the areas of piston arrangements 17,18 upon which the pressurized medium acts, constitutes a hydraulic safety function so that the above described movements are always caused to occur in the above described sequence, i.e. that the lifting arm and the lifting fork first form the desired V-configuration and, thereafter, travel vertically in this V-configuration. When lowering, it is evident that the above-mentioned movements occur in a reversed order.

The lifting device made in accordance with the present invention comprises also an hydraulic safety arrangement. As described above, the cylinder of the lifting motor 15 is fed with a pressurized medium from a pump through the secondary tube-like piston arrangement 18 causing the lifting arm 2 and the lifting fork 3 to move upwardly from their lowermost position. The lowering operation is caused by releasing the pressurized medium from cylinder 16 through a center hole 24 in the secondary piston arrangement 18, and through said hole 24, is arranged a release valve 25 which is so constructed that the volume of pressurized medium thus being released is constant independently of the pressure in cylinder 16. The construction of such a release valve controlling the oil flow is known to the persons skilled in the art and should therefore not have to be described in detail. When the supply of pressurized medium from the pump to the cylinder 16 is stopped and a mechanical safety arrangement, which will later be described, is manually made non-active, the lifting arm 2, the lifting fork 3 and the load carried will descend under gravitational forces thereby pushing the pressurized medium out through hole 24 and valve 25. Since the flow is controlled and constant independently of the pressure in cylinder 16, the lowering speed will be constant independently of a large or small load or if no load is on the lifting fork and the lifting arm. Valve 25 is conventionally constructed so as to halt any oil flow if a rupture in the cylinder or pump conduits occur or if the pump should malfunction, whereby the lowering is automatically stopped. The lifting device in accordance with the present invention comprises a number of mechanical safety devices, which are so constructed as to allow the device to unconditionally function as intended. These mechanical safety devices are entirely independent of the above described hydraulically operating safety devices, so that a multiplicity of safety functions are included within the present invention.

At the lower portion of the upright mast section 1, are provided lugs 26 which extend outwardly from the front portion of each beam member 1*a* of the upright mast section, and which engage with the inner ends of the arm 3*a* of the lifting fork 3 when the lifting fork is in the lowermost position. Lugs 26 mechanically prevent the inner ends of arms 3*a* to move upwards when the lifting movement is initiated so that the lifting fork 3, under all circumstances will swivel upwardly to its outward and upward inclined position. When lifting fork 3 has reached this position, the inner ends of arms 3*a* will have moved outwards from the mast section 1 a sufficient distance to clear lugs 26 whereby the lifting fork and the lifting arm may be raised vertically as earlier described.

A locking rail 27 is pivotally connected to extension element 22 of the lifting fork 3 and extends between levers 2*b* of the lifting arm 2 and lifting motor 15. At its upper end, the locking rail 27 is provided with a stopping surface 28 and levers 2*b* of the lifting arm 2 are provided with a similar stopping surface 29, preferably in the form of a cross-member between the free ends of levers 2*b* and located behind the levers and rollers 4. When the lifting arms and the lifting fork are in their lowest position, the locking rail 27 extends upwards in an inclined position from extension elements 22 between the lifting motor 15 and the stopping surface 29 and is held in such position by an elastic retractable force, preferably a fixed rubber cushion, between the locking rail 27 and the lifting motor 15. During the primary lifting sequence, levers 2*b* of the lifting fork 2 swivel towards the front portion of the upright mast section 1 and the lifting motor 15, the stopping surface 29 contacts the rearward side of the locking rail 27 and pushes gradually the locking rail 27 to a substantially vertical position. When the sequence of lifting has reached the point where the lifting arm 2 has attained the desired inclined position, the stopping surface 28 of the locking rail 27 moves under and into contact with the stopping surface 29 of levers 2*b* and is held in this locking position under elastic force. The locking rail secures and locks a distance, between the inner ends of the lifting arm 2 and the lifting fork 3, which is equal to the length of the locking rail 27 and which is set in relation to the desired inclination of the lifting arm 2 relative to the lifting fork 3.

The lower portion of the locking rail 27 has a rigidly connected rearwardly extending lever 30. During the lowering sequence, lever 30 comes into contact with the base plate 1*b* of the upright mast section 1 via a compression spring mounted to lever 30. Contact with the base plate is arranged to take place a short instance before relative pivotal movement between the lifting arm 2 and the lifting fork 3 begins, whereby the locking rail 27 swivels towards the lifting motor 15 which causes the locking surface 28 to disengage from the locking surface 29 whereby continued movement between the lifting arm 2 relative to the lifting fork 3 is permitted.

The levers 2*b* of the lifting arm 2 are each equipped with hingedly secured ratchets 31 which are connected with one another by means of a cross-member and are spring-loaded against the rear vertical flanges 32 of the respective upright mast sections 1*a* in such a way that they will connect with any of a number of locking lugs 33 which are located at certain heights from the base and fixedly secured onto the rear vertical flanges 32 of the mast section. By using these ratchets 31, the lifting arm 2 and the lifting fork 3 may thereby be locked into any desired lifting heights; at the same time, the locking rail 27 mechanically prevents any pivotal movement between the lifting arm 2 and the lifting fork 3 to maintain the desired V-configuration between the members. During the lowering, ratchets 31 are prevented from being engaged with the locking lugs 33 by means of a manually operated handle 34. The handle 34 is preferably connected to a vertical rod 35 which extends from the enlarged wedge-shaped portion 1*c* of the upright mast section 1 to the upper portion of the mast section between the locking lugs and the cross-member connecting ratchets 31. The vertical rod 35 is excentrically mounted in bearings at both ends. By swiveling handle 34, rod 35 is caused to rotate and, due to its excentric mounting, ratchets 31 are forced out independently of the present lifting height.

The above described lifting device has only been described in relation to one specific form of the invention, but it may be refined in various ways without departing from the scope. For instance, the upright mast section 1 may be fixedly secured to a wall instead of resting upon a foundation. It is envisaged that the upright mast section may be constructed to receive two lifting arms 2 with accompanying lifting forks 3 extending outwards opposite each other including their respective operative arrangement.

The embodiments of the invention in which an exclusive property or privilege is claimed are defined as follows:

1. A device for lifting an object, comprising: an upright vertical mast section; a substantially linear lifting motor included within said mast sections; a lifting arm having an inner end slidably mounted onto said mast section and freely extending outwardly therefrom, said inner end being pivotally connected to said motor; and a lifting fork pivotally connected to a free end of said lifting arm; said lifting arm and said lifting fork, in their lowest position, extending horizontally outwardly from said mast section; the inner ends of said arm and said fork being hingedly mounted and vertically-displaceably guided onto said mast section in such a manner that, when said inner end of said lifting arm is first vertically displaced from said lowest position by said lifting motor a given upward distance along said mast section, said lifting arm pivots about its inner end to an outward and downward inclined position and said lifting fork pivots about its inner end to an outward and upward inclined position; said lifting motor thereafter causing the inner end of said lifting arm to travel a further upward distance along said mast section and to cause the displacement of the inner end of said lifting fork while maintaining the relative inclined position of said lifting arm and said lifting fork.

2. A device as defined in claim 1, wherein said lifting arm includes at least two rigidly connected beam members extending in parallel relationship to each other, and said lifting fork includes at least two beam members extending in parallel relationship to each other and have their respective mid-section pivotally joined at said free end of the lifting arm.

3. A device as defined in claim 2, wherein said lifting arm further includes upwardly extending levers forming an obtuse angle with said beam members of said lifting arm and being provided at their respective free ends with roller means contacting a rolling surface in said upright mast section; said rolling surface including an upper straight portion and a lower inclined portion forming an obtuse angle relative to said straight upper portion and extending downwardly and away from said lifting arm.

4. A device as defined in claim 3, wherein said beam members of said lifting fork are provided at the inner ends thereof with rollers which contact a second straight vertical surface on said mast section; during initial movement of said lifting fork, said rollers function first as a fixed bearing for said lifting fork and, secondly, as a roller bearing on said second surface during vertical lifting of said lifting arm together with said lifting fork.

5. A device as defined in claim 4, wherein said mast section includes two vertical parallel channels with flanged portions located in line with and directly opposite each other, said upper portion of said rolling surface for said roller means of said lifting arm being the inner surface of at least one of said flanged portions; the lower portion of said rolling surface consisting of an inclined plate extending towards said inner surface; the outer surface of said flanged portions constituting a guiding rail for said rollers of said lifting fork.

6. A device according to claim 4, wherein said lifting motor consists of an hydraulic jack with a cylinder and a primary piston unit displaceable into said cylinder and a secondary piston unit displaceable in said primary piston unit; one portion of said secondary piston unit resting on a support fixed to said mast section; said primary piston unit and said cylinder being pivotally connected to the inner end of said lifting arm; a portion of said primary piston unit protruding out of said cylinder being provided with a stopper engageable with an extension element on said lifting fork, said extension element by-passing said rollers and the respective beam members of said lifting fork.

7. A device as defined in claim 6, wherein said primary piston unit has a larger effective area than said second piston unit in order that, when supplied with a pressurized medium, said primary piston unit first protrudes out of said cylinder for its entire length of stroke and, secondly, telescopes said secondary piston unit out of said primary piston unit until a desired lifting height is reached.

8. A device as defined in claim 7, wherein said length of stroke of said primary piston unit equals the vertical distance between the inner ends of said lifting arm and of said lifting fork when said beam members are in said inclined position.

9. A device in accordance with claim 8, wherein said lifting motor is connected to a pump for the supply of said pressurized medium so as to lift said lifting fork and said lifting arm along with said object, and a valve at the free end of said secondary piston unit for the release of said pressurized medium when said lifting arm and said lifting fork along with said object are lowered.

10. A device as defined in claim 9, wherein said valve is constructed in such a way that the flow of pressurized medium returning to said pump remains at a steady rate independently of the pressure exerted by said lifting motor so as to maintain the lowering speed constant.

11. A device as defined in claim 10, wherein said valve is so constructed as to block the flow of pressurized medium from said lifting motor in the event of accidental rupture.

12. A device as defined in claim 11, further comprising a bracket at the lower portion of said mast section, adapted to grip over at least one edge of the beam members of said lifting fork when said lifting fork is in an horizontal position so as to prevent any vertical movement of said edge, and adapted to cause said edge to freely move upwards when said lifting fork has reached its outward and upward inclined position.

13. A device as defined in claim 12, wherein, at the end of said extension element of said lifting fork, a locking rail is pivotally mounted to come into contact with a stopping surface located on said levers of said lifting arm when said lifting arm and said lifting fork have reached their inclined position, said locking rail securing said arm and fork in said inclined position.

14. A device as defined in claim 13, wherein said locking rail is elastically loaded and is forced towards said stopping surface; said locking rail having, at its lower portion, a rigidly connected rearwardly extending lever adapted to come into contact with a spring bearing surface of said mast section so as to pivot said locking rail away from said stopping surface.

15. A device as defined in claim 14, comprising ratchets on said lifting arm being spring-loaded as to engage locking lugs secured on said mast section at various lifting heights and lock the lifting arm and fork at desired lifting heights; said ratchets being forced out of said locking lugs by a manually operable handle.

16. A device as defined in claim 1, further comprising support means for said object pivotally mounted adjacent said inner end of said lifting arm and support means pivotally mounted and longitudinally slidable onto the outer end of said lifting fork; a spacer being provided between said support means.

* * * * *